Aug. 10, 1965     J. H. THEDICK     3,199,554
ADJUSTABLE BOARD STOP FOR FLYING SAWS
Filed Dec. 13, 1962     2 Sheets-Sheet 1
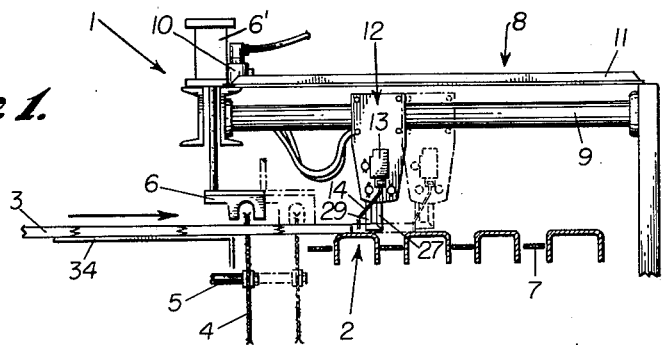
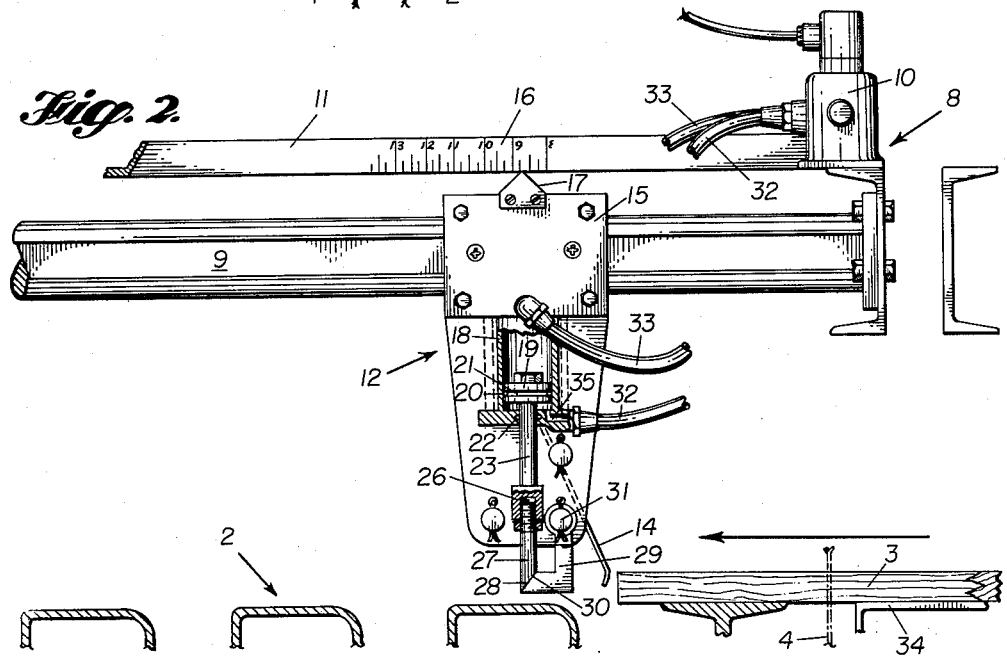
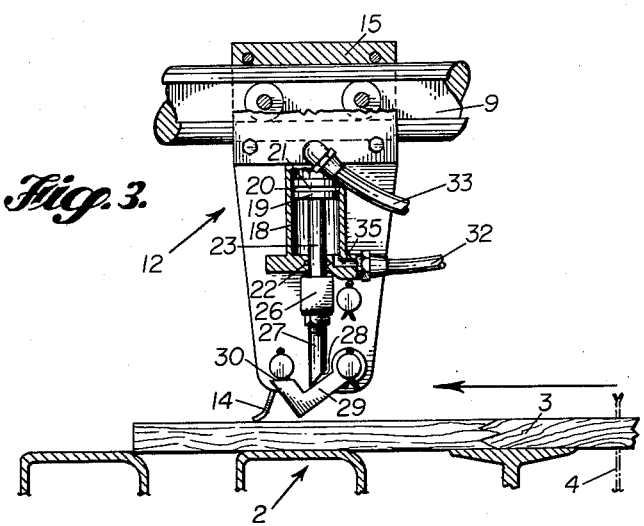
INVENTOR.
JOHN H. THEDICK
ATTORNEYS

INVENTOR.
JOHN H. THEDICK
BY
ATTORNEYS

United States Patent Office 3,199,554
Patented Aug. 10, 1965

3,199,554
ADJUSTABLE BOARD STOP FOR FLYING SAWS
John H. Thedick, Klamath Falls, Oreg., assignor to Weyerhaeuser Company, Tacoma, Wash., a corporation of Washington
Filed Dec. 13, 1962, Ser. No. 244,421
8 Claims. (Cl. 143—47)

This invention relates to an adjustable board stop for a flying saw operation. More specifically, this invention relates to a stop having a positive holding means for the material being cut.

In the art of cutting wood panels of a predetermined length, it has become conventional in the art to use what is known as a flying saw. These saws are automatically operated by a limit switch that is tripped by the oncoming edge of the panel strip to be cut.

Difficulties have arisen in the above-noted flying saw cutting operation because the feed speed of the wood paneling to be cut may be fed into the cutting operation at different speeds. This would result in a non-uniform length of wood paneling cut. Also, occasionally it would be necessary to stop the wood paneling on the slide just short of the limit switch for various reasons. When the wood paneling was subsequently restarted, the length of the wood panel cut would vary. This made it necessary to compensate for these inaccuracies.

The principal object of this invention is to provide an improved stop means for use with a flying saw operation.

Another object of this invention is to provide a stop means in a flying saw cutting operation to positively hold the wood paneling while it is being cut.

Another object of this invention is to provide a stop means to hold the variations in the length of wood paneling cut in a flying saw operation at a minimum.

These and other objects and advantages of the present invention will become clear to those skilled in the art when taken in conjunction with the detailed description and the drawings wherein:

FIGURE 1 is an elevational view, partly in cross section, illustrating a flying saw which embodies the present invention.

FIGURE 2 is a detailed elevational view, partly in section, of the stop means of the present invention.

FIGURE 3 is an elevational view, partly in section, showing the stop means in another position.

Figure 4:
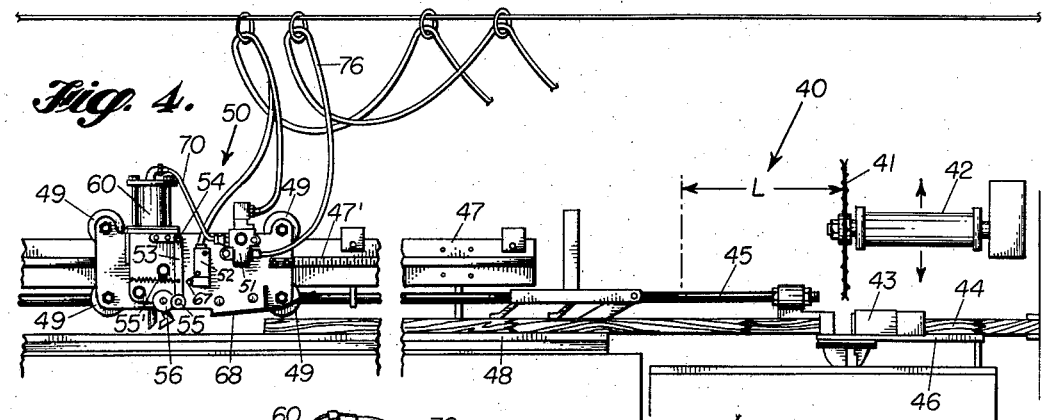
FIGURE 4 is a side elevational view of another embodiment of the present invention.

Referring to FIGURES 1–3 inclusive, a first embodiment of the present invention is disclosed. Generally indicated at 1 is a flying saw cutting unit that embodies the present invention.

The flying saw unit generally comprises a table 2 for receiving wood panels 3. Above the table 2, there is provided a frame generally indicated at 8. The frame 8 comprises a mounting shaft 9 to an indicator bar 11. Pneumatic clamps 6 are connected to an air cylinder 6' mounted on the frame 8 and are actuated by valve 10.

The flying saw unit 1 is also provided with the usual saw blade 4 mounted on a shaft 5 to cut the panels or boards 3 into predetermined lengths.

Mounted on the shaft 9 of the frame 8 is a mechanical limiting unit generally indicated at 12 embodying the present invention. The mechanical limiting unit 12 is provided with the usual limit switch 13 having an actuator arm 14 extending downwardly therefrom into the path of the panel or board 3. The mechanical limiting unit 12 is adjustably but rigidly mounted on shaft 9 by a collar 15. The collar is provided with a pointer 17 which points to a scale 16 on the calibration bar 11. In this manner the exact distance between the mechanical limiting unit 12 and the clamp unit 6 can be accurately determined and set.

Located centrally of the mechanical limiting unit 12, there is provided an air cylinder 18 having a piston member 19 therein. The piston member 19 is provided with the usual O-ring seals 20 mounted in a groove 21. Rigidly mounted on the piston 19 and extending through the lower end of the cylinder 18 is a piston rod member 23. O-ring seals 22 are mounted between piston rod 23 and the lower end of the cylinder 18. Connected to the lower end of the piston rod 23 by a connector 26 is a blade member 27. The blade member 27 is provided with a beveled surface 28. Mounted on the lower end of the mechanical limiting unit 12, as by pivot pin 31, is an L-shaped stop member 29. The lateral extension of the L-shaped member 29 is provided with a complementary bevel surface 30 that engages the bevel surface 28 of blade member 27 to hold the vertical portion of the member 29 in a vertical position.

Communicating between the air cylinder 18 and the valve 10 are a pair of hoses 32 and 33. The hose 33 communicates the upper portion of the air cylinder 18 above the piston 19 with the valve 10. The hose 32 is connected to an L-shaped passage 35 which communicates the underside of piston 19 in cylinder 18 with the valve 10.

In the operation of the embodiment disclosed in FIGURES 1–3 inclusive, the mechanical limiting unit 12 is first adjusted on shaft 9 for the proper length of the board panels to be cut as indicated by the scale 16.

Air from valve 10 is then communicated through hose 33 into the air cylinder 18 on top of piston 19 to push the blade 27 into the lower position as shown in FIGURE 2. In this position, the blade 27 engages the arm member 29 to hold it in a vertical position.

When the panels or boards slide down the slide 34 and reach the mechanical limiting unit 12, the panel 3 engages the stop arm or member 29. The moving panel or board pushes the table 2 and frame 8 with it momentarily, as shown in dotted lines in FIGURE 1, until the clamp 6, actuated by the limit switch 13, engages the panel or board 3 which starts the sawing cycle. At this time the air cylinder 18 receives air through passage 35 and hose 32 from valve 10. This moves the piston 19 up in cylinder 18 to retract blade 27. This releases the stop arm 29 and it pivots on pin 31 to allow the panel 3 to pass underneath the mechanical limiting unit 12. The cut panels 3 are then transferred to belts 7 and moved laterally off the table. The table 2 then returns to its original position in preparation for the next sawing cycle. The timed delay relay actuating valve 10 then returns the blade 4 to a down position before the next panel reaches the stop for the next sawing cycle.

Figure 5:
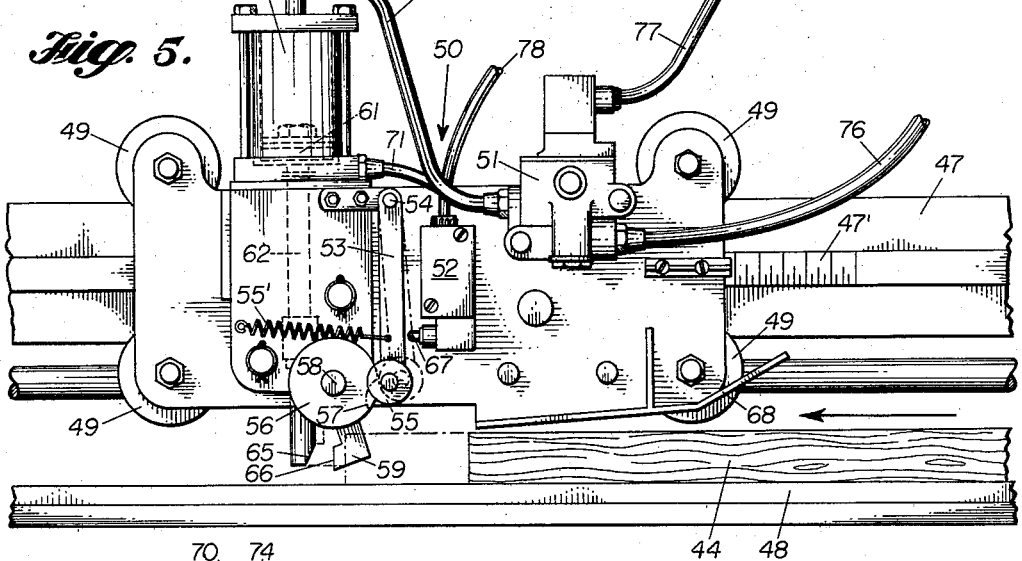
FIGURE 5 is a detailed elevational view of the stop means illustrated in FIGURE 4.
Figure 6:
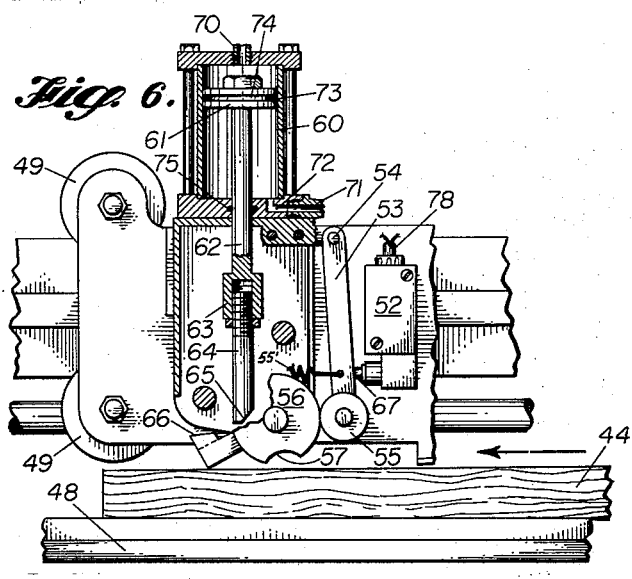
FIGURE 6 is an elevation view, partly in section, of the stop means of FIGURE 5 in another position.

Referring to FIGURES 4–6 inclusive, another embodiment of the present invention is disclosed. In this embodiment a flying chop saw unit generally indicated at 40 is disclosed.

The flying chop saw 40 comprises the usual saw blade 41 mounted on a shaft 42. Below the saw blade 41 and mounted on a table 46 are pneumatic clamp members 43. The clamp members 43 function to engage the panels or boards 44 during the cutting operation. Rigidly mounted on one end of the table 46 is a rod member 45. The other end of the rod member 45 is rigidly connected to a movable mechanical limiting unit member generally indicated at 50.

The mechanical limiting unit 50 is mounted on ball bearing rollers 49 which roll on a rail 47 mounted on slide 48. The rail 47 is provided with a scale 47' which determines the exact length of the board to be cut.

The mechanical limiting unit 50 is also provided with guides 68 on its lower end to properly guide the panels or boards 44 into position.

A limit switch 52 is mounted on the side of the mechanical limiting unit 50 and is provided with a plunger 67 to actuate the same in a manner as hereinafter described. Connected between the clamps 43 and the limit switch 52 are lead wires designated at 78 which actuates a solenoid valve, not shown, that operates an air cylinder, not shown, connected to clamp 43.

Pivotally mounted on the upper end of the mechanical limiting unit 50, as on a pin 54, is a lever arm 53 having an enlarged ball member 55 attached to its lower end. Intermediate the ends of the arm member 53, a spring is provided indicated at 55' to maintain the arm member 53 in engagement with a cam member 56 pivotally mounted on the mechanical limiting unit 50 on a pivot pin 58. On the periphery of the cam member 56 there is provided a recess 57 which is complementary with the ball section 55.

Rigidly mounted on the cam member 56 is an L-shaped stop member 59. The lateral portion of the L-shaped member 59 is provided with a bevel portion or surface 66. The bevel portion 66 cooperates with a complementary bevel portion 65 on blade member 64.

The blade member 64 is connected to a piston rod 62 by a connector 63 and serves as a release means for the stop member 59. The piston rod 62 is interconnected to a piston 61 which is mounted in an air cylinder 60. The air cylinder 60 is properly provided with O-ring seals 75 around piston rod 62. Also, O-ring seals are mounted in grooves 74 in piston 61.

A hose 70 interconnects the upper end of the air cylinder 60 with an actuating valve 51. A hose 71 is connected to an L-shaped passage 72 in the lower end of the air cylinder 60 and communicates the lower end of the cylinder 60 with the valve 51.

The valve 51 is suitably secured to a source of air pressure by a hose 76. Also, electrical leads 77 interconnect the valve with a suitable source of electric current.

In operation, the length of the board or panel to be cut is first adjusted by adjusting rod 45 to the desired length as indicated by the scale 47' on the rails 47.

The panels 44 then move on to table 46 and onto slides 48. The panels or boards 44 are properly guided into position by guide members 68 on the mechanical limiting unit 50.

When the end of the board or panel 44 contacts stop members 59, the stop member pivots so that the bevel surfaces 66 and 65 engage. This movement of the stop member 59 will rotate cam member 56 about pivot pin 58. This will cause the recess 57 to move out from behind ball member 57 and swing the arm member 53 laterally. This will depress the plunger 67 on the limit switch 52 as shown in dotted line and actuate the clamp members 43.

The flying chop saw unit 40 including the blade 41, shaft 42, clamps 43, table 46, rod 45, and mechanical limiting unit 50 all move along with the panel 44 to be cut a distance designated at L in FIGURE 4 during which time the sawing operation is completed.

When the sawing cycle is completed, the valve 51 is actuated and air pressure is communicated through hose 71 to the lower end of the piston member 61. This will move the piston upwardly in the air cylinder 60 and retract the blade 64 to release the stop member 59 and allow the wood panel 44 to pass through the mechanical limiting unit 50 and move off the table in any conventional manner.

As the saw table 46 reaches the end of its travel, the clamps 43 are released and the saw table 46 returns to its original position, pulling the mechanical limiting unit 50 with it. The actuating valve 51 then operates to return the blade 64 to its downward position by communicating air pressure through hose 70 to the upper end of piston member 61. Also, a spring, not shown, rotates the cam member 56 and stop member 59 to their original positions with the ball member 55 on arm member 53 engaging the recess 57 in the cam member 56. The flying chop saw is now ready for the next sawing cycle.

While specific details of preferred embodiments have been set forth above, it will be apparent that many changes and modifications may be made without departing from the spirit of the invention. It will therefore be understood that what has been described herein is intended to be illustrative only, and is not intended to limit the scope of the invention.

What is claimed is:

1. A flying saw for cutting wood panels or boards into predetermined lengths, comprising: clamping means engageable with said wood panels, mechanical limiting means spaced a predetermined distance from said clamping means including a limit switch, valve means actuated by said limiting switch adapted to actuate said clamping means, an L-shaped stop means with a lateral extension, said stop means pivotally mounted on said mechanical limiting means engageable with said wood panels to positively hold said wood panels said predetermined distance between said mechanical limiting means and said clamping means, and means mounted on said mechanical limiting means releasably engaging said lateral extension of said stop means to positively hold said stop means into engagement with said wood panels.

2. A flying saw for cutting wood panels into predetermined lengths of a character described in claim 1 wherein said L-shaped stop means includes a beveled surface on the lateral extension thereof engageable with a complementary beveled surface on said releasable engaging means.

3. A flying saw for cutting wood panels into predetermined lengths as set forth in claim 1 wherein said release means comprises: an air cylinder mounted on said mechanical limiting means, a piston member within said cylinder having a piston rod extending through the lower end of said cylinder and a blade member connected to said piston rod and engageable with said stop means.

4. A mechanical limiting means adapted to be mounted on a shaft of a flying saw unit, comprising: a limit switch, a lever arm adapted to actuate said limiting switch, an L-shaped stop means pivotally mounted on the lower end of said mechanical limiting means, and means mounted on said mechanical limiting means releasably engaging said stop means comprising an air cylinder, a piston in said air cylinder having a piston rod extending through the lower end of said air cylinder and engageable with said L-shaped stop means.

5. A mechanical limiting means as set forth in claim 4 wherein the lateral extension of said L-shaped stop means and the lower end of said piston rod are each provided with bevel surfaces.

6. A mechanical limiting means adapted to be mounted on a rail of a flying saw unit, comprising: ball bearing rollers mounted on said limiting means, a limit switch mounted on said mechanical limiting means, a lever arm pivotally mounted on said mechanical limiting means and engageable with said limit switch to actuate the same, cam means mounted on a pivot pin on said mechanical limiting means, stop means pivotally mounted on said pin, and release means engageable with said stop means comprising an air cylinder mounted on said mechanical limiting means, a piston within said air cylinder, a piston rod connected to said piston and extending through the lower end of said air cylinder and engageable with said stop means.

7. A mechanical stop means as set forth in claim 6 wherein said stop means is in the form of an L-shaped member.

8. A mechanical stop unit as set forth in claim 7 wherein the lateral extension of said L-shaped member and the lower end of said piston rod are each provided with a complementary beveled surface.

References Cited by the Examiner

UNITED STATES PATENTS

| | | | |
|---|---|---|---|
| 1,360,029 | 11/20 | Roessling | 93—80 |
| 1,413,191 | 4/22 | Roland | 83—291 X |
| 2,209,995 | 8/40 | Morris | 83—69.3 |
| 2,370,932 | 3/45 | Bolling | 143—47.7 |
| 2,711,006 | 6/55 | Abbey | 143—47.7 |
| 2,812,787 | 11/57 | Bibby | 143—47.7 |

ANDREW R. JUHASZ, *Primary Examiner.*

DON R. SCHRAN, WILLIAM W. DYER, JR.,
*Examiners.*